July 19, 1960

C. F. BILINSKI 2,945,439

SYSTEM FOR EXPELLING A MASS

Filed May 11, 1955

INVENTOR.
Chester F. Bilinski
BY
Thiess Olsen, Mecklenburger,
van Holst, & Coltman. Attys.

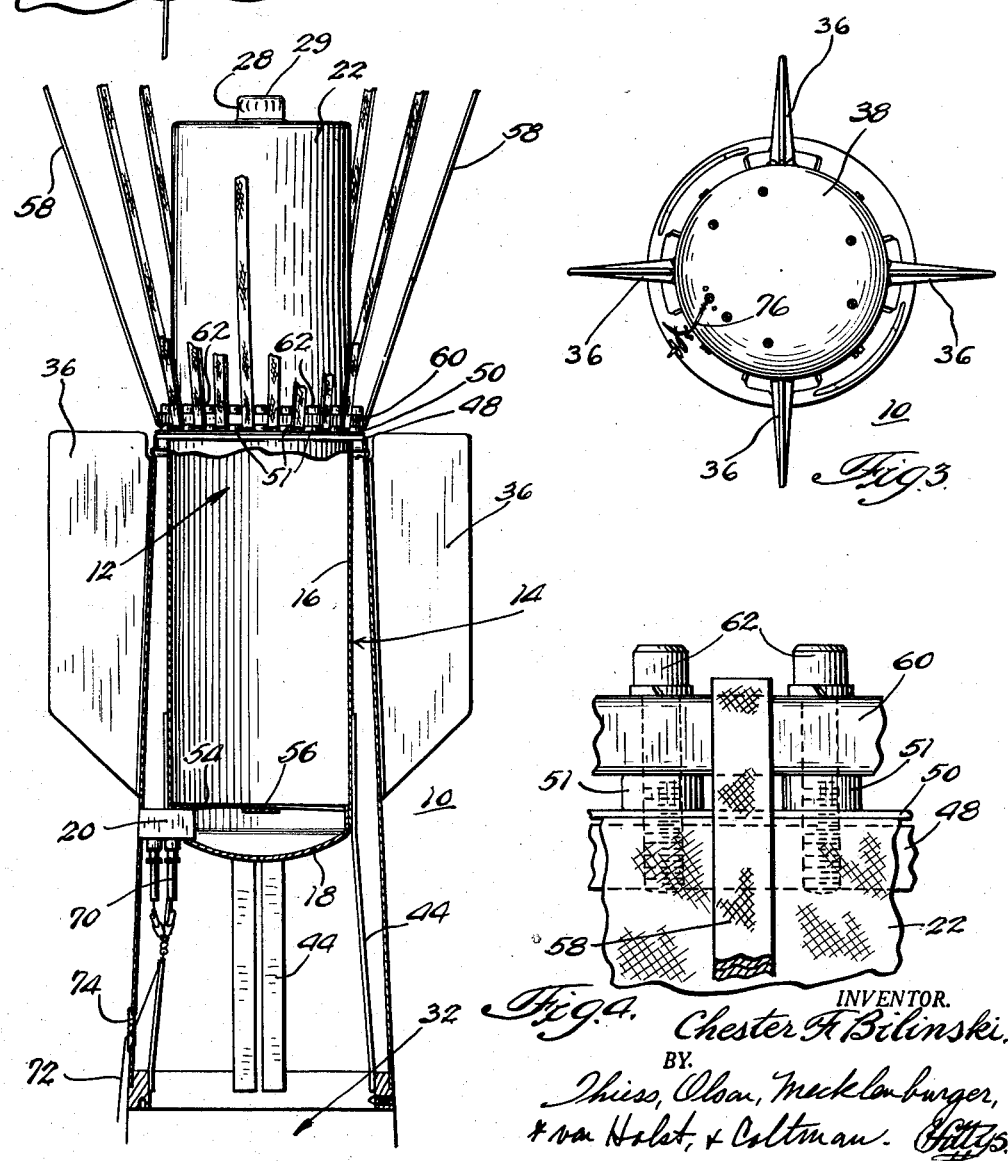

United States Patent Office 2,945,439
Patented July 19, 1960

2,945,439
SYSTEM FOR EXPELLING A MASS

Chester F. Bilinski, Chicago, Ill., assignor, by mesne assignments, to Cook Electric Company, Chicago, Ill., a corporation of Delaware Filed May 11, 1955, Ser. No. 507,580

11 Claims. (Cl. 102—4)

This invention relates to an improved system for expelling or projecting a mass, and more particularly to the utilization of an expulsion means and closed chamber for the forceful ejection of a mass from a substantially rigid enclosure.

While the scope of this invention, as stated above, is believed to be broad and includes transportation or expulsion of any mass from within an enclosure, the particular problem which inspired the present invention was that of deploying a parachute from a rapidly moving missile or vehicle. At high speeds it is necessary to rapidly and positively eject a parachute from a falling missile, and the normal techniques of gravitational discharge or utilization of air currents is unsatisfactory. Therefore, some positive system of deploying the parachute and removing the parachute to a substantial distance from the missile is required. Various mechanisms have heretofore been proposed for accomplishing such ejection, including mechanical linkages, coil springs, and the like. All of these systems have proven generally unsatisfactory. Such systems are complex and are not positive in operation under conditions of extreme acceleration, vibration, or other physical phenomenon.

It is therefore one important object of this invention to provide an improved system for expelling a mass from an enclosure.

It is another object of this invention to provide an improved system for expelling a mass from an enclosure which is positive in operation irrespective of the conditions of velocity or acceleration of the enclosure and will function at high altitudes.

It is another object of this invention to provide an improved system for expelling a mass from an enclosure which is simple and which requires a minimum number of parts, none of which is a mechanical linkage or conventional moving part.

It is still a further object of this invention to provide an improved system for expelling a mass from an enclosure which employs an explosive charge without hazard to the mass expelled.

It is a further object of this invention to provide a system for expelling a mass from an enclosure which employs an explosive charge and functions as a healed piston for the positive ejection of the mass without premature loss of the expanding gases.

It is still a further object of this invention to provide an improved system for deploying a parachute from a missile whereby the parachute is positively ejected by an explosive charge without danger of damage to the parachute through contact with the exploding gases.

Further and additional objects of this invention will become manifest from a consideration of this specification, the accompanying drawings, and the appended claims.

In one form of this invention a missile adapted for discharge from an aircraft during the accumulation of meteorological data is provided with a rearward compartment containing a packed parachute and an explosive charge for expelling the parachute from the enclosure. More particularly, a flexible receiver contains the parachute, isolates the parachute from the explosive charge, and seals the explosive charge and associated explosion chamber from the atmosphere.

For a more complete understanding of this invention reference will now be made to the accompanying drawings, wherein:

Fig. 2 is a reduced partial elevational view of the embodiment of Fig. 1 showing the ejecting system in an actuated position and an associated parachute in the open position;

Fig. 3 is a top plan view of the embodiment of Fig. 1; and

Fig. 4 is an enlarged fragmentary view of the annular clamping assembly employed in the embodiment of Fig. 1.

Figure 1:
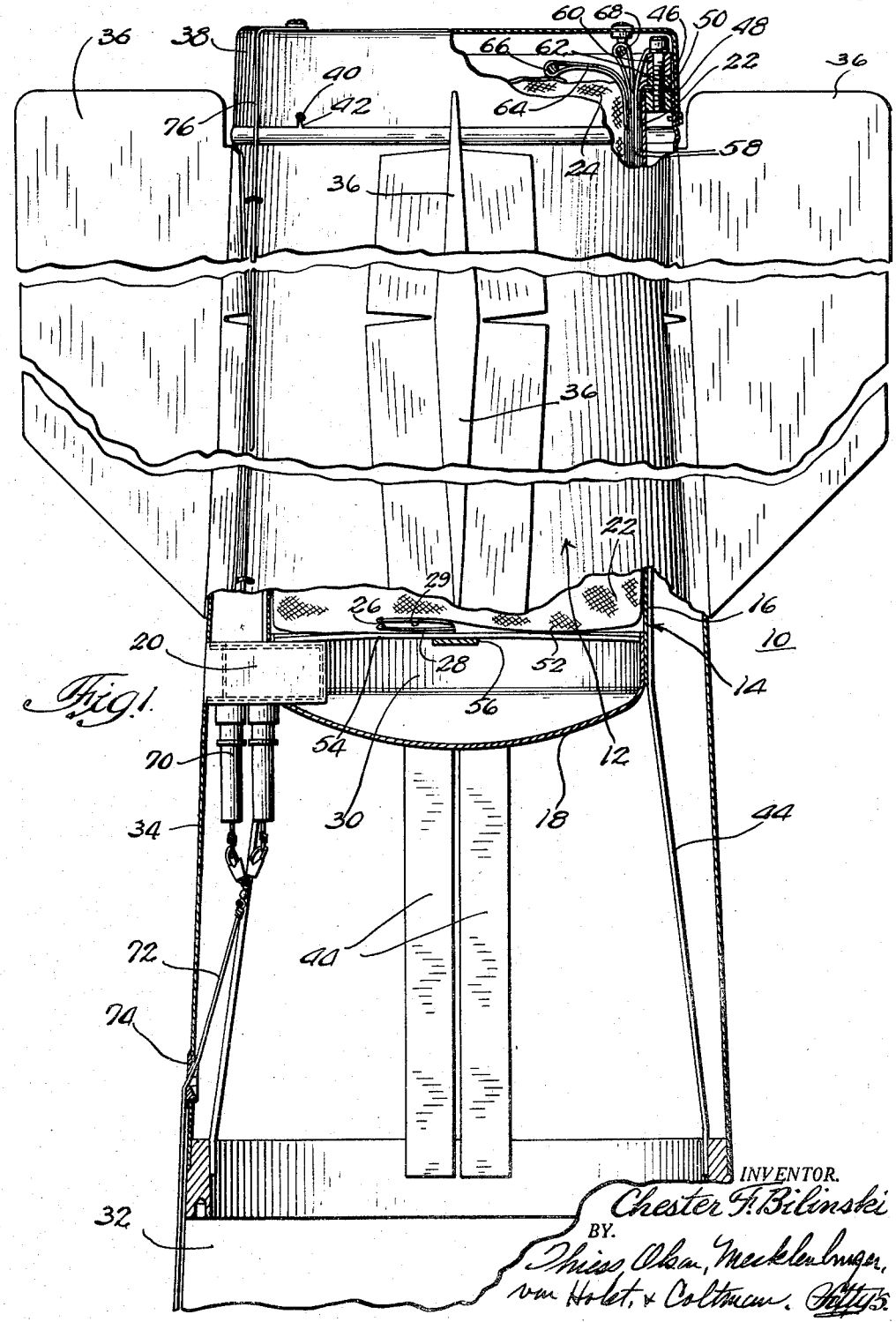
Figure 1 is a partial elevational view of one embodiment of this invention incorporated into an airborne missile and shown partly in section.

Referring now to the drawings and more particularly to Fig. 1, a missile 10 is partially illustrated showing the nature and the disposition of the parachute deploying system 12. The use of this invention as a system for deploying a parachute from a missile is merely illustrative and it should be understood that the concept of utilizing a flexible mass receiver and explosive charge as taught herein is to be considered in its broadest sense. The deploying system 12 includes three basic components which are believed essential to satisfactory operation of any system utilized for deploying a mass in accordance with this invention. These comprise a rigid enclosure 14 having side walls 16 and a closed end 18, an explosive charge 20 disposed in said closure adjacent to said closed end 18, and a flexible mass receiver 22 which is sealed to the open end of the enclosure 14 and defines a cavity within the enclosure to receive an appropriate mass, such as parachute 24. The flexible receiver 22 may be made of any material having the desired flexibility and a relatively low porosity.

In one particuluar embodiment of this invention a heavy grade of duck fabric treated for fire resistance was employed as a flexible receiver and functioned satisfactorily. However, it is believed clear that various fabrics, impregnated or otherwise, or plastic nonporous films might be employed with equal satisfaction. Upon discharge of the explosive charge 20 the rapidly expanding gases force the parachute 24 outwardly from the open end of the missile 10, and escape of the gases from the explosive charge 20 is prevented by the sealed chamber defined by rigid enclosure 14 and flexible receiver 22. The mass 24 is thereby positively expelled with a highly efficient piston action. The stroke of the piston is effectively twice the length of the rigid enclosure 14 as a result of the continued expansion of the gases within the chamber and the inversion of the flexible receiver 22, causing it to assume the position shown in Fig. 2.

A central aperture 26 is provided at the base of flexible receiver 22 whereby upon the complete expansion of the flexible receiver the excess pressure is released via the aperture without causing a fracture or other damage to the flexible receiver 22. The aperture 26 is normally sealed whenever the mass is in the quiescent position within the enclosure 14. This sealing is effected by a sleeve 28 extending from the end of receiver 22 and providing a discharge tube along which the excess gases must travel. The sleeve 28 will normally be folded over in such a manner that a positive gastight seal is formed to retain the gases within the explosion chamber 30 until the mass has been removed to a substantial distance from the missile. Damage to the parachute from fire or heat is avoided by the bag 22, and damage from abrasion or snagging of the parachute is avoided by the interposed fabric of the receiver. A foraminous insert 29 closes the aperture 26 to provide reinforcement of the receiver 22.

Referring once again to Fig. 1 the details of the particular embodiment disclosed will be described in greater detail. The missile has a forward portion 32 which may contain either data accumulating equipment, or explosive charges, depending upon the purpose of the particular device. A sheet metal tail assembly 34 extends rearwardly from the missile body 32 to define a housing for the parachute ejecting assembly 12 and also to mount a plurality of stabilizing fins 36.

The housing 34 is open at its rearwardmost end and a cover 38 is provided for this opening. A plurality of machine screws 40 are secured in the housing 34 and resiliently engage slotted portions 42 of the cover 38, whereby the cover may be forcefully removed from the housing. Within the housing 34 the rigid enclosure 14 is mounted on a plurality of supports 44. The enclosure 14 is a circular cylinder having one open end which is formed with a flange. The flange is secured to a mounting ring 48 about the rearward open end of housing 34. Ring 48 has a plurality of threaded apertures therein to receive clamping bolts 62.

Flexible mass receiver 22 having a shape which is generally that of a circular cylinder is disposed within the enclosure 14 and has a substantially closed end 52 and an open end sealed to the open end of the enclosure 14. Sealing thereof is effected by clamping engagement between the annular ring 48 and a clamping ring 50. As described above, the closed end 52 of receiver 22 has central aperture 26 therein surrounded by sleeve 28. The flexible receiver 22 extends downwardly into the enclosure 14 and rests on a supporting structure comprising cross transverse slats 54 and 56. The cross transverse slats 54 and 56 define the exploding chamber 30, and the receiver 22 and the received mass 24 rest thereon above the chamber 30.

In the particular embodiment described as applied to parachutes it is necessary to secure a plurality of straps 58 between the deployed mass 24 and the rearward portion of the housing 34. The straps 58 are shown in Fig. 1 as extending downwardly into the cavity defined by flexible receiver 22. The straps are looped about a retaining annular ring 60 mounted above the clamping ring 50 and spaced therefrom by annular spacers 46. The clamping ring 50, annular spacers 46, and retaining ring 60 are secured in rigid abutting relationship against the end of housing 34 by a plurality of clamping screws 62. The fabric receiver 22 is thereby clamped to form a sealed enclosure.

Another feature of the illustrated embodiment of the mass deploying apparatus which is especially adapted for deploying parachutes is the utilization of the cover 38 as a pilot parachute to insure positive positioning and opening of the main parachute 24. In the particular embodiment described the cover 38 is connected to the upper central portion of the parachute 24 by a plurality of woven straps 64 which are looped about appropriate clevis means 66 and 68. Clevis means 68 are permanently mounted in the upper surface of the cover 38, while clevis means 66 are secured to the parachute fabric in any appropriate manner such as by sewing. Thus, as shown most clearly in Fig. 2, the cover 38 will, during normal descent, be disposed above the main parachute 24 at a distance determined by the length of straps 64 and will function as a pilot parachute during descent of the missile. The main parachute 24 will be secured to the missile by shrouds 58 which will be connected between peripheral points on the parachute canopy and predetermined points about the retaining ring 60 in the conventional and well understood manner.

Any source of a rapidly expanding gas may be employed for the expulsion of the mass 24 from the enclosure 14. This might be in the form of capsules of highly compressed gas, such as carbon-dioxide, or preferably in the form of explosive powder, such as conventional black powder. As shown in the illustrated embodiment a black powder charge 20 is employed and this charge is ignited through a pair of igniters 70. The igniters may be of any conventional type and will not be described in detail. As shown, the technique for energizing the igniter 70 includes a wire 72 extending outwardly through a bushing 74 in the housing 34, and this wire might be actuated either during descent of the missile by a timing means or at the time of discharge of the missile from an aircraft. A connecting wire 76 is also shown extending from the cover 38 into the body 32 and this may be utilized to control other devices within the body upon the discharge of the cover 38 from the missile. The wire 76 in the case of explosive missiles may be used to arm the missile for subsequent detonation and in the case of data taking missiles may be employed to actuate the information collecting equipment.

It will be clearly understood from this disclosure that while the described embodiment relates to airborne missiles and to the discharge of parachutes therefrom, this invention is of broad scope and includes the discharge of any mass from any rigid enclosure to any fluid medium. Thus, this basic structure may be applied to the discharge of bodies into the water under water research or the deployment of the components into fluid bodies during industrial processes and the like.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A system for expelling a mass comprising a substantially rigid cylindrical enclosure having one end closed, a flexible low porosity cylindrical receiver having one end closed, annular means engaging the open end of said enclosure and sealing the open end of said receiver thereagainst about substantially the entire periphery thereof, said receiver defining a mass receiving cavity within said enclosure, the closed end of said receiver defining an aperture of predetermined size, means for sealing said aperture whenever such mass is in said cavity, and explosive means within said enclosure, said flexible receiver being disposed between said cavity and said explosive means whereby a mass disposed in said cavity will be forcefully expelled by the central portion of said receiver to a position substantially removed from said enclosure by the expansion of said explosive means.

2. A system for expelling a mass comprising a substantially rigid cylindrical enclosure having one end closed, a flexible low porosity cylindrical receiver having one end closed, annular means engaging the open end of said enclosure and sealing the open end of said receiver thereagainst about substantially the entire periphery thereof, said receiver defining a mass receiving cavity within said enclosure, the closed end of said receiver defining an aperture of predetermined size, spacing means in said enclosure to define an explosive chamber adjacent to said cavity, means for sealing said aperture between said spacing means and such mass disposed in said cavity, and explosive means within said chamber, said flexible receiver being disposed between said cavity and said chamber whereby a mass disposed in said cavity will be forcefully expelled by the central portion of said receiver to a position substantially removed from said enclosure by the expansion of said explosive means.

3. A system for expelling a mass comprising a substantially rigid cylindrical enclosure having one end closed, a flexible low porosity cylindrical receiver having one end closed, annular means engaging the open end of said enclosure and sealing the open end of said receiver thereagainst about substantially the entire periphery thereof, said receiver defining a mass receiving cavity within said enclosure, the closed end of said receiver defining an aperture of predetermined size, spacing means in said enclosure to define an explosive chamber adjacent to said cavity, flexible sleeve means extending from said aperture and foldable to effectively seal said aperture between said spacing means and such mass in said cavity, and explosive means within said chamber, said flexible receiver being disposed between said cavity and said chamber whereby a mass disposed in said cavity will be forcefully expelled by the central portion of said receiver to a position substantially removed from said enclosure by the expansion of said explosive means.

4. A system for expelling a mass comprising a substantially rigid cylindrical enclosure having one end closed, a flexible low porosity cylindrical receiver having one end closed, annular means engaging the open end of said enclosure and sealing the open end of said receiver thereagainst about substantially the entire periphery thereof, said receiver defining a mass receiving cavity within said enclosure, the closed end of said receiver defining an aperture of predetermined size, means for sealing said aperture whenever such mass is in said cavity, substantially rigid cover means yieldably mounted over the opening in said enclosure, and explosive means within said enclosure, said flexible receiver being disposed between said cavity and said explosive means whereby a mass disposed in said cavity will be forcefully expelled by the central portion of said receiver to a position substantially removed from said enclosure by the expansion of said explosive means.

5. A system for deploying a parachute comprising a substantially rigid enclosure having an opening therein, a flexible low porosity cylindrical receiver having one end closed, annular means engaging the open end of said enclosure and sealing the open end of said receiver thereagainst about substantially the entire periphery thereof, said receiver defining a parachute receiving cavity within said enclosure, the closed end of said receiver defining an aperture of predetermined size, spacing means in said enclosure to define an explosive chamber adjacent to said cavity, flexible sleeve means extending from said aperture and foldable to effectively seal said aperture between said spacing means and such parachute in said cavity, flexible connecting means securing the periphery of such parachute to said enclosure, and explosive means within said chamber, said flexible receiver being disposed between said cavity and said chamber whereby a parachute disposed in said cavity will be forcefully expelled by the central portion of said receiver to a position substantially removed from said enclosure by the expansion of said explosive means.

6. A system for deploying a parachute comprising a substantially rigid enclosure having an opening therein, a flexible low porosity cylindrical receiver having one end closed, annular means engaging the open end of said enclosure and sealing the open end of said receiver thereagainst about substantially the entire periphery thereof, said receiver defining a parachute receiving cavity within said enclosure, the closed end of said receiver defining an aperture of predetermined size, spacing means in said enclosure to define an explosive chamber adjacent to said cavity, flexible sleeve means extending from said aperture and foldable to effectively seal said aperture between said spacing means and such parachute in said cavity, flexible connecting means securing the periphery of such parachute to said enclosure, rigid cover means yieldably secured over the opening in said enclosure, and explosive means within said chamber, said flexible receiver being disposed between said cavity and said chamber whereby a parachute disposed in said cavity will be forcefully expelled by the central portion of said receiver to a position substantially removed from said enclosure by the expansion of said explosive means.

7. A system for deploying a parachute comprising a substantially rigid enclosure having an opening therein, a flexible low porosity cylindrical receiver having one end closed, annular means engaging the open end of said enclosure and sealing the open end of said receiver thereagainst about substantially the entire periphery thereof, said receiver defining a parachute receiving cavity within said enclosure, the closed end of said receiver defining an aperture of predetermined size, spacing means in said enclosure to define an explosive chamber adjacent to said cavity, flexible sleeve means extending from said aperture and foldable to effectively seal said aperture between said spacing means and such parachute in said cavity, flexible connecting means securing the periphery of such parachute to said enclosure, rigid cover means yieldably secured over the opening in said enclosure, flexible connecting means between said cover and such parachute, said cover forming an air resistant pilot parachute, and explosive means within said chamber, said flexible receiver being disposed between said cavity and said chamber whereby a parachute disposed in said cavity will be forcefully expelled by the central portion of said receiver to a position substantially removed from said enclosure by the expansion of said explosive means.

8. A missile having a body portion and a parachute deploying portion rearwardly thereof, said parachute deploying portion comprising a substantially rigid enclosure having an opening therein, a flexible low porosity cylindrical receiver having one end closed, annular means engaging the open end of said enclosure and sealing the open end of said receiver thereagainst about substantially the entire periphery thereof, said receiver defining a parachute receiving cavity within said enclosure, the closed end of said receiver defining an aperture of predetermined size, spacing means in said enclosure to define an explosive chamber adjacent to said cavity, flexible sleeve means extending from said aperture and foldable to effectively seal said aperture between said spacing means and such parachute in said cavity, flexible connecting means securing the periphery of such parachute to said enclosure, rigid cover means yieldably secured over the opening in said enclosure, flexible connecting means between said cover and such parachute, said cover forming and air resistant pilot parachute, and explosive means within said chamber, said flexible receiver being disposed between said cavity and said chamber whereby a parachute disposed in said cavity will be forcefully expelled by the central portion of said receiver to a position substantially removed from said enclosure by the expansion of said explosive means.

9. A system for expelling a mass comprising: a substantially rigid elongate container having one end open; a flexible, low-porosity sleeve having first and second openings; means for sealing said open end to said sleeve at the said first opening such that said sleeve will form a mass-receiving cavity upon insertion into said container, and will define an expansible chamber between said container and said sleeve; a mass disposed within said receiving cavity; a source of rapidly expanding gas in cooperative relationship with said chamber; means for actuating said source to yield said gas, and thereby expanding said chamber and causing said sleeve and mass to be forcibly expelled from the confines of said container; and vent means effectively sealed by proximity of said mass and coupled to said sleeve at said second opening, said vent means becoming operable to allow the effective passage of said gas from the said chamber only after said mass has moved away from said vent means.

10. A system for expelling a mass comprising: a substantially rigid elongate container having one end open; a flexible, low-porosity sleeve having first and second openings; means for sealing said open end to said sleeve at the said first opening such that said sleeve will form a mass-receiving cavity upon insertion into said container, and will define an expansible chamber between said container and said sleeve; a mass disposed within said receiving cavity; means disposed within said container to provide support for said mass and said sleeve; a source of rapidly expanding gas in cooperative relationship with said chamber; means for actuating said source to yield said gas, and thereby expanding said chamber and causing said sleeve and mass to be forcibly expelled from the confines of said container; and vent means effectively sealed by proximity of said mass and coupled to said sleeve at said second opening, said vent means becoming operable to allow the effective passage of said gas from the said chamber only after said mass has moved away from said vent means.

11. A system for expelling a mass comprising: a substantially rigid elongate container having one end open; a first flexible sleeve of low porosity material having first and second openings; means for sealing said open end to said first sleeve at the said first opening such that said first sleeve will form a mass-receiving cavity upon insertion into said container, and will define an expansible chamber between said container and said first sleeve; a mass disposed within said receiving cavity; a source of rapidly expanding gas in cooperative relationship with said chamber; means for actuating said source to yield said gas, thereby expanding said chamber and causing said first sleeve and mass to be forcibly expelled from the confines of said container; and a second flexible sleeve coupled to and extendable from said second opening, said second sleeve being foldable within said receiving cavity and adjacent said mass to prevent the free flow of said gas from said chamber so long as said mass is in contact with said second sleeve.

References Cited in the file of this patent

UNITED STATES PATENTS

| | | |
|---|---|---|
| 1,165,846 | Calthrop | Dec. 28, 1915 |
| 1,192,479 | Van Meter | July 25, 1916 |
| 1,770,954 | Stone | July 22, 1930 |
| 1,908,243 | Herrick | May 9, 1933 |
| 2,379,203 | Vertzinsky | June 26, 1945 |
| 2,455,845 | Wells | Dec. 7, 1948 |